US009995183B2

(12) United States Patent
Sheren et al.

(10) Patent No.: US 9,995,183 B2
(45) Date of Patent: Jun. 12, 2018

(54) VALVE ACTUATING DEVICE AND METHOD OF MAKING SAME

(71) Applicant: Eaton Corporation, Cleveland, OH (US)

(72) Inventors: James R. Sheren, Grand Ledge, MI (US); Anthony L. Spoor, Union City, MI (US); Luigi Lia, Turin (IT); Philip Michael Kline, Tekonsha, MI (US)

(73) Assignee: EATON CORPORATION, Cleveland, OH (US)

( * ) Notice: Subject to any disclaimer, the term of this patent is extended or adjusted under 35 U.S.C. 154(b) by 191 days.

(21) Appl. No.: 15/171,457

(22) Filed: Jun. 2, 2016

(65) Prior Publication Data

US 2016/0273413 A1   Sep. 22, 2016

Related U.S. Application Data

(63) Continuation of application No. 14/838,749, filed on Aug. 28, 2015, now Pat. No. 9,869,211, which is a
(Continued)

(51) Int. Cl.
F01L 1/18 (2006.01)
B21D 53/84 (2006.01)
(Continued)

(52) U.S. Cl.
CPC ............. F01L 1/18 (2013.01); B21D 53/84 (2013.01); B23P 19/04 (2013.01); B23P 19/042 (2013.01);
(Continued)

(58) Field of Classification Search
CPC ......... Y10T 29/49295; Y10T 29/49845; Y10T 29/49908; Y10T 29/49925;
(Continued)

(56) References Cited

U.S. PATENT DOCUMENTS 2,385,309 A   9/1945 Spencer et al.
2,573,522 A   10/1951 Watt
(Continued)

FOREIGN PATENT DOCUMENTS

CN   1324430 A    11/2001
CN   101161995 A   4/2008
(Continued)

OTHER PUBLICATIONS

U.S. Appl. No. 14/876,026, filed Oct. 6, 2015, Pending.
(Continued)

Primary Examiner — Peter DungBa Vo
Assistant Examiner — Joshua D Anderson
(74) Attorney, Agent, or Firm — GTC Law Group PC & Affiliates

(57) ABSTRACT

Tools and methods for indenting and assembling a switching rocker arm assembly having an inner arm, an outer arm and a latch. The tools and methods are directed to eliminating requirements for matched sets of components of rocker arm assemblies so that the assembled indented parts have desired latch lash tolerances. The tools used include fixtures and clamps for indenting kidney-bean shaped passages in an outer arm that mount a pivot axle of the outer arm. The tools used may also include a fixture and clamps for indenting a latch shelf of the inner arm. Indenting the inner arm and outer arm using these methods and fixtures results in switching rocker arm assemblies that fit together, and when assembled into a valve, have a desired latch lash.

8 Claims, 9 Drawing Sheets

Related U.S. Application Data continuation of application No. PCT/US2015/018445, filed on Mar. 3, 2015, which is a continuation-in-part of application No. PCT/US2014/019870, filed on Mar. 3, 2014.

(60) Provisional application No. 61/986,976, filed on May 1, 2014, provisional application No. 62/081,306, filed on Nov. 18, 2014.

(51) Int. Cl.
*B23P 19/04* (2006.01)
*F01L 13/00* (2006.01)

(52) U.S. Cl.
CPC ........... *F01L 1/185* (2013.01); *F01L 13/0021* (2013.01); *F01L 2001/186* (2013.01); *F01L 2103/01* (2013.01); *Y10T 29/49107* (2015.01)

(58) Field of Classification Search
CPC ........... Y10T 29/49247; Y10T 29/4984; Y10T 29/49938; Y10T 29/49947; B21K 1/20; B21K 1/205; B21D 53/84; B23P 19/04; B23P 19/042; B23P 2700/11; B23P 2700/50; B23P 11/005; B23P 15/00; F01L 1/18; F01L 1/185; F01L 2001/186; F01L 2001/187; F01L 13/0005; F01L 13/0021; F01L 2103/00; F01L 2103/01
USPC ................................ 29/888.2, 437, 505, 515
See application file for complete search history.

(56) References Cited

U.S. PATENT DOCUMENTS

| | | |
|---|---|---|
| 2,694,389 A | 11/1954 | Turkish |
| 3,332,405 A | 7/1967 | Haviland et al. |
| 4,376,447 A | 3/1983 | Chumley |
| 4,491,010 A | 1/1985 | Brandt et al. |
| 4,762,096 A | 8/1988 | Kamm et al. |
| 4,788,947 A | 12/1988 | Edelmayer |
| 4,858,886 A | 8/1989 | Tatara |
| 4,873,949 A | 10/1989 | Fujiyoshi et al. |
| 4,942,853 A | 7/1990 | Konno |
| 4,969,352 A | 11/1990 | Sellnau |
| 4,995,281 A | 2/1991 | Allor et al. |
| 5,018,313 A | 5/1991 | Yamane et al. |
| 5,103,779 A | 4/1992 | Hare, Sr. |
| 5,109,675 A | 5/1992 | Hwang |
| 5,320,795 A | 6/1994 | Mitchell et al. |
| 5,367,904 A | 11/1994 | Sellnau |
| 5,431,133 A | 7/1995 | Spath et al. |
| 5,603,294 A | 2/1997 | Kawai |
| 5,619,958 A | 4/1997 | Hampton et al. |
| 5,623,897 A | 4/1997 | Hampton et al. |
| 5,660,153 A | 8/1997 | Hampton et al. |
| 5,769,043 A | 6/1998 | Nitkiewicz |
| 6,057,692 A | 5/2000 | Allmendinger et al. |
| 6,178,997 B1 | 1/2001 | Adams et al. |
| 6,186,100 B1 | 2/2001 | Sawada et al. |
| 6,318,342 B1 | 11/2001 | Simon et al. |
| 6,469,500 B1 | 10/2002 | Schmitz et al. |
| 6,474,276 B1 | 11/2002 | Schmitz et al. |
| 6,476,599 B1 | 11/2002 | Czimmek et al. |
| 6,532,920 B1 | 3/2003 | Sweetnam et al. |
| 6,550,494 B2 | 4/2003 | Yoneda et al. |
| 6,557,518 B1 | 5/2003 | Albertson et al. |
| 6,561,036 B1 | 5/2003 | Gustafsson et al. |
| 6,575,128 B2 | 6/2003 | Nakamura et al. |
| 6,591,798 B2 | 7/2003 | Hendriksma et al. |
| 6,598,569 B2 | 7/2003 | Takemura et al. |
| 6,615,782 B1 | 9/2003 | Hendriksma et al. |
| 6,633,157 B1 | 10/2003 | Yamaki et al. |
| 6,668,775 B2 | 12/2003 | Harris |
| 6,691,657 B2 | 2/2004 | Hendriksma et al. |
| 6,769,387 B2 | 8/2004 | Hayman et al. |
| 6,895,351 B2 | 5/2005 | Grumstrup et al. |
| 6,923,151 B2 | 8/2005 | Kreuter |
| 6,932,041 B1 | 8/2005 | Riley |
| 6,966,291 B1 | 11/2005 | Fischer et al. |
| 6,973,820 B2 | 12/2005 | Watarai et al. |
| 6,989,669 B2 | 1/2006 | Low et al. |
| 6,994,061 B2 | 2/2006 | Magner et al. |
| 7,034,527 B2 | 4/2006 | Low et al. |
| 7,047,925 B2 | 5/2006 | Hendriksma et al. |
| 7,051,639 B2 | 5/2006 | Krone et al. |
| 7,107,950 B2 | 9/2006 | Arinaga et al. |
| 7,116,097 B2 | 10/2006 | Revankar et al. |
| 7,117,726 B1 | 10/2006 | Krieger |
| 7,207,301 B2 | 4/2007 | Hathaway et al. |
| 7,240,652 B2 | 7/2007 | Roerig et al. |
| 7,259,553 B2 | 8/2007 | Arns, Jr. et al. |
| 7,305,951 B2 | 12/2007 | Kunz et al. |
| 7,307,418 B2 | 12/2007 | Low et al. |
| 7,318,402 B2 | 1/2008 | Harman et al. |
| 7,360,290 B2 | 4/2008 | Nozaki et al. |
| 7,377,247 B2 | 5/2008 | Seitz |
| RE40,439 E | 7/2008 | Brehob et al. |
| 7,439,733 B2 | 10/2008 | Arns, Jr. et al. |
| 7,458,158 B2 | 12/2008 | Luo et al. |
| 7,484,487 B2 | 2/2009 | Zurface et al. |
| 7,546,822 B2 | 6/2009 | Murphy et al. |
| 7,546,827 B1 | 6/2009 | Wade et al. |
| 7,562,643 B2 | 7/2009 | Akasaka |
| 7,631,425 B2 | 12/2009 | Kamiji et al. |
| 7,677,213 B2 | 3/2010 | Deierlein |
| 7,730,771 B2 | 6/2010 | Ludwig et al. |
| 7,737,685 B2 | 6/2010 | Low et al. |
| 7,755,350 B2 | 7/2010 | Arns, Jr. et al. |
| 7,761,988 B2 | 7/2010 | Rorig et al. |
| 7,854,215 B2 | 12/2010 | Rozario et al. |
| 7,882,814 B2 | 2/2011 | Spath et al. |
| 7,926,455 B2 | 4/2011 | Manther et al. |
| 7,975,662 B2 | 7/2011 | Nakashima et al. |
| 7,987,826 B2 | 8/2011 | Kwak et al. |
| 8,033,256 B2 | 10/2011 | Takahashi et al. |
| 8,037,601 B2 | 10/2011 | Kawatake |
| 8,082,092 B2 | 12/2011 | Frank et al. |
| 8,096,170 B2 | 1/2012 | Mayrhofer |
| 8,151,636 B2 | 4/2012 | Siraky |
| 8,162,002 B2 | 4/2012 | Pavin et al. |
| 8,215,275 B2 | 7/2012 | Church |
| 8,225,764 B2 | 7/2012 | Yoon et al. |
| 8,240,278 B2 | 8/2012 | Jeon et al. |
| 8,312,849 B2 | 11/2012 | Roe et al. |
| 8,327,750 B2 | 12/2012 | Keller et al. |
| 8,375,909 B2 | 2/2013 | Radulescu et al. |
| 8,448,618 B2 | 5/2013 | Lee et al. |
| 8,464,677 B2 | 6/2013 | Choi et al. |
| 8,474,425 B2 | 7/2013 | Kirbach |
| 8,505,365 B2 | 8/2013 | Stretch et al. |
| 8,534,182 B2 | 9/2013 | Keller et al. |
| 8,555,835 B2 | 10/2013 | Pätzold et al. |
| 8,635,980 B2 | 1/2014 | Church |
| 8,656,878 B2 | 2/2014 | Moeck |
| 8,677,958 B2 | 3/2014 | Becker et al. |
| 8,726,862 B2 | 5/2014 | Zurface et al. |
| 8,752,513 B2 | 6/2014 | Zurface et al. |
| 8,789,506 B2 * | 7/2014 | Poskie ............... F01L 1/185 123/90.41 |
| 8,820,279 B2 | 9/2014 | Roussey et al. |
| 8,915,225 B2 | 12/2014 | Zurface et al. |
| 8,985,074 B2 | 3/2015 | Zurface |
| 9,016,252 B2 | 4/2015 | Zurface et al. |
| 9,038,586 B2 | 5/2015 | Schultheis et al. |
| 9,194,261 B2 | 11/2015 | McCarthy |
| 9,228,454 B2 | 1/2016 | VanDeusen |
| 9,267,396 B2 | 2/2016 | Zurface et al. |
| 9,284,859 B2 | 3/2016 | Nielsen et al. |
| 9,291,075 B2 | 3/2016 | Zurface et al. |
| 9,581,058 B2 | 2/2017 | Radulescu et al. |
| 9,644,503 B2 | 5/2017 | Zurface et al. |
| 9,664,075 B2 | 5/2017 | Mccarthy, Jr. |
| 9,702,279 B2 | 7/2017 | Zurface et al. |

(56) References Cited

U.S. PATENT DOCUMENTS

| | | |
|---|---|---|
| 9,708,942 B2 | 7/2017 | Zurface et al. |
| 9,726,052 B2 | 8/2017 | Zurface et al. |
| 9,822,673 B2 | 11/2017 | Spoor et al. |
| 2001/0052254 A1 | 12/2001 | Easterbrook et al. |
| 2003/0140876 A1 | 7/2003 | Yang et al. |
| 2003/0192497 A1 | 10/2003 | Hendriksma et al. |
| 2003/0200947 A1 | 10/2003 | Harris et al. |
| 2003/0209217 A1 | 11/2003 | Hendriksma et al. |
| 2003/0217715 A1 | 11/2003 | Pierik |
| 2004/0003789 A1 | 1/2004 | Kreuter |
| 2004/0074459 A1 | 4/2004 | Hayman et al. |
| 2004/0103869 A1 | 6/2004 | Harris |
| 2004/0188212 A1 | 9/2004 | Weilant et al. |
| 2005/0016480 A1 | 1/2005 | Ferracin et al. |
| 2005/0051119 A1 | 3/2005 | Bloms et al. |
| 2005/0188930 A1 | 9/2005 | Best |
| 2005/0193973 A1 | 9/2005 | Hendriksma et al. |
| 2005/0247279 A1 | 11/2005 | Rorig et al. |
| 2006/0037578 A1 | 2/2006 | Nakamura |
| 2006/0081202 A1 | 4/2006 | Verner et al. |
| 2007/0039573 A1 | 2/2007 | Deierlein |
| 2007/0101958 A1 | 5/2007 | Seitz |
| 2007/0113809 A1 | 5/2007 | Harman et al. |
| 2007/0125329 A1 | 6/2007 | Rohe et al. |
| 2007/0155580 A1 | 7/2007 | Nichols et al. |
| 2007/0186890 A1 | 8/2007 | Zurface et al. |
| 2007/0283914 A1 | 12/2007 | Zurface et al. |
| 2008/0044646 A1 | 2/2008 | Rorig et al. |
| 2008/0072854 A1 | 3/2008 | Tochiki et al. |
| 2008/0127917 A1 | 6/2008 | Riley et al. |
| 2008/0149059 A1 | 6/2008 | Murphy et al. |
| 2008/0268388 A1 | 10/2008 | Zanella et al. |
| 2008/0283003 A1 | 11/2008 | Hendriksma |
| 2009/0000882 A1 | 1/2009 | Siebke |
| 2009/0064954 A1 | 3/2009 | Manther |
| 2009/0082944 A1 | 3/2009 | Frank et al. |
| 2009/0084340 A1 | 4/2009 | Komura et al. |
| 2009/0090189 A1 | 4/2009 | Villaire |
| 2009/0143963 A1 | 6/2009 | Hendriksma |
| 2009/0217895 A1 | 9/2009 | Spath et al. |
| 2009/0223473 A1 | 9/2009 | Elnick et al. |
| 2009/0228167 A1 | 9/2009 | Waters et al. |
| 2009/0293597 A1 | 12/2009 | Andrie |
| 2010/0018482 A1 | 1/2010 | Keller et al. |
| 2010/0095918 A1 | 4/2010 | Cecur |
| 2010/0223787 A1 | 9/2010 | Lopez-Crevillen et al. |
| 2010/0246061 A1 | 9/2010 | Sechi |
| 2010/0300389 A1 | 12/2010 | Manther et al. |
| 2010/0300390 A1 | 12/2010 | Manther |
| 2011/0226047 A1 | 9/2011 | Stretch et al. |
| 2011/0226208 A1 | 9/2011 | Zurface et al. |
| 2011/0226209 A1 | 9/2011 | Zurface et al. |
| 2012/0037107 A1 | 2/2012 | Church |
| 2012/0163412 A1 | 6/2012 | Stretch |
| 2013/0000582 A1 | 1/2013 | Church et al. |
| 2013/0068182 A1 | 3/2013 | Keller et al. |
| 2013/0233265 A1 | 9/2013 | Zurface et al. |
| 2013/0255612 A1 | 10/2013 | Zurface et al. |
| 2013/0306013 A1 | 11/2013 | Zurface et al. |
| 2013/0312506 A1 | 11/2013 | Nielsen et al. |
| 2013/0312681 A1 | 11/2013 | Schultheis et al. |
| 2013/0312686 A1 | 11/2013 | Zurface et al. |
| 2013/0312687 A1 | 11/2013 | Zurface et al. |
| 2013/0312688 A1 | 11/2013 | VanDeusen |
| 2013/0312689 A1 | 11/2013 | Zurface et al. |
| 2014/0190431 A1 | 7/2014 | McCarthy, Jr. |
| 2014/0283768 A1 | 9/2014 | Keller et al. |
| 2015/0211394 A1 | 7/2015 | Zurface et al. |
| 2015/0267574 A1 | 9/2015 | Radulescu et al. |
| 2015/0369095 A1 | 12/2015 | Spoor et al. |
| 2015/0371793 A1 | 12/2015 | Sheren et al. |
| 2016/0061067 A1 | 3/2016 | Schultheis et al. |
| 2016/0084117 A1 | 3/2016 | Zurface et al. |
| 2016/0108766 A1 | 4/2016 | Zurface et al. |
| 2016/0115831 A1 | 4/2016 | Spoor |
| 2016/0130991 A1 | 5/2016 | Zurface et al. |
| 2016/0138435 A1 | 5/2016 | Zurface et al. |
| 2016/0138438 A1 | 5/2016 | Genise et al. |
| 2016/0138484 A1 | 5/2016 | Nielsen et al. |
| 2016/0146064 A1 | 5/2016 | Spoor et al. |
| 2016/0169065 A1 | 6/2016 | VanDeusen |
| 2016/0230619 A1 | 8/2016 | McCarthy, Jr. |
| 2017/0138230 A1 | 5/2017 | Radulescu et al. |
| 2017/0248073 A1 | 8/2017 | Mccarthy |
| 2017/0298785 A1 | 10/2017 | Zurface et al. |
| 2017/0328244 A1 | 11/2017 | VanDeusen |

FOREIGN PATENT DOCUMENTS

| | | |
|---|---|---|
| CN | 101310095 A | 11/2008 |
| CN | 101328819 A | 12/2008 |
| CN | 101595280 A | 12/2009 |
| CN | 104047655 A | 9/2014 |
| CN | 104153906 A | 11/2014 |
| CN | 204152661 U | 2/2015 |
| CN | 204082242 | 7/2015 |
| DE | 20309702 U1 | 9/2003 |
| DE | 102004017103 A1 | 10/2005 |
| DE | 102006040410 A1 | 3/2008 |
| DE | 102006046573 A1 | 4/2008 |
| DE | 102006057895 A1 | 6/2008 |
| DE | 102008062187 A1 | 6/2010 |
| DE | 102010002109 A1 | 8/2011 |
| DE | 102010052551 A1 | 5/2012 |
| EP | 1426599 A1 | 6/2004 |
| EP | 1662113 A2 | 5/2006 |
| EP | 1785595 A1 | 5/2007 |
| EP | 1895111 A1 | 3/2008 |
| EP | 2256307 A1 | 12/2010 |
| EP | 2770174 A1 | 8/2014 |
| GB | 171409 A | 8/1922 |
| JP | 56041309 A | 4/1981 |
| JP | 02308912 A | 12/1990 |
| JP | 08154416 A | 6/1996 |
| JP | 09303600 A | 11/1997 |
| JP | 09329009 A | 12/1997 |
| JP | H11141653 A | 5/1999 |
| JP | 2000130122 A | 5/2000 |
| JP | 2000180304 A | 6/2000 |
| JP | 2001249722 A | 9/2001 |
| JP | 2002097906 A | 4/2002 |
| JP | 2002371809 A | 12/2002 |
| JP | 2003083148 A | 3/2003 |
| JP | 2004293695 A | 10/2004 |
| JP | 2005098217 A | 4/2005 |
| JP | 2006049103 A | 2/2006 |
| JP | 2007162099 A | 6/2007 |
| JP | 2008014180 A | 1/2008 |
| JP | 2008121433 A | 5/2008 |
| JP | 2008184956 A | 8/2008 |
| JP | 2010059821 A | 3/2010 |
| JP | 2010106311 A | 5/2010 |
| JP | 2012184463 A | 9/2012 |
| JP | 2012193724 A | 10/2012 |
| JP | 2013522542 A | 6/2013 |
| KR | 20030061489 A | 7/2003 |
| KR | 100482854 B1 | 4/2005 |
| KR | 1020060070014 A | 6/2006 |
| KR | 1020080032726 A | 4/2008 |
| KR | 1020100130895 A | 12/2010 |
| WO | 2007053070 A1 | 5/2007 |
| WO | 2007057769 A2 | 5/2007 |
| WO | 2010011727 A2 | 1/2010 |
| WO | 2010011727 A3 | 5/2011 |
| WO | 2011116329 A2 | 9/2011 |
| WO | 2011116331 A2 | 9/2011 |
| WO | 2011116329 A3 | 11/2011 |
| WO | 2011116331 A3 | 11/2011 |
| WO | 2013159120 A1 | 10/2013 |
| WO | 2013159121 A1 | 10/2013 |
| WO | 2013166029 A1 | 11/2013 |
| WO | 2014071373 A1 | 5/2014 |
| WO | 2014134601 A1 | 9/2014 |
| WO | 2014168988 A1 | 10/2014 |

(56) References Cited

FOREIGN PATENT DOCUMENTS

| WO | 2014168988 A9 | 10/2014 |
|---|---|---|
| WO | 2014134601 A9 | 2/2015 |
| WO | 2015134466 A1 | 9/2015 |

OTHER PUBLICATIONS 13777728.0, "European Application Serial No. 13777728.0, Extended European Search Report dated Feb. 11, 2016", Eaton Corporation, 7 Pages.
13784871.9, "European Application Serial No. 13784871.9, Extended European Search Report dated Jun. 1, 2016", Eaton Corporation, 10 Pages.
13851457.5, "European Application Serial No. 13851457.5, Extended European Search Report dated Sep. 2, 2016", Eaton Corporation, 6 Pages.
14756458.7, "European Application Serial No. 14756458.7, Extended European Search Report dated Aug. 29, 2016", Eaton Corporation, 6 Pages.
14782089.8, "European Application Serial No. 14782089.8, Extended European Search Report dated Jan. 2, 2017", Eaton Corporation, 7 Pages.
PCT/US2015/018445, "International Application Serial No. PCT/US2015/018445, International Preliminary Report on Patentability and Written Opinion dated Sep. 15, 2016", Eaton Corporation, 9 Pages.
U.S. Appl. No. 61/722,765, U.S. Appl. No. 61/722,765, filed Nov. 5, 2012.
U.S. Appl. No. 15/671,212, filed Aug. 8, 2017, Pending.
U.S. Appl. No. 15/710,199, filed Sep. 20, 2017, Pending.
U.S. Appl. No. 15/790,956, filed Oct. 23, 2017, Pending.
U.S. Appl. No. 15/792,401, filed Oct. 24, 2017, Pending.
U.S. Appl. No. 15/792,469, filed Oct. 24, 2017, Pending.
U.S. Appl. No. 15/830,559, filed Dec. 4, 2017, Pending.
U.S. Appl. No. 15/835,718, filed Dec. 8, 2017, Pending.
13778301.5, "European Application Serial No. 13778301.5, Extended European Search Report dated Feb. 19, 2016", Eaton Corporation, 7 pages.
13784871.9, "European Application Serial No. 13784871.9, European Search Report dated Feb. 5, 2016", Eaton Corporation, 7 Pages.
U.S. Appl. No. 61/986,976, "U.S. Appl. No. 61/986,976, filed May 1, 2014", James Sheren, 16 Pages.
U.S. Appl. No. 62/081,306, "U.S. Appl. No. 62/081,306, filed Nov. 18, 2014", James Sheren, 29 Pages.
AVL Group, "Pressure Sensors for Combustion Analysis", AVL Product Catalog—Edition 2011, AVL Group, Graz, Austria, https://www.avl.com/c/document_library/get_file?p_l_id=10473&folderId=49895&name=DLFE-1821.pdf&version=1.1 [accessed Aug. 30, 2013], Jan. 2011, pp. 1-123.
Citizen Finetech Miyota Co., Ltd, "Combustion Pressure Sensors", Citizen Finetech Miyota Co., Ltd, Japan, cfm.citizen.co.jp/english/product/pressure_sensor.html [accessed Aug. 30, 2013], 2013, pp. 1-3.
Ngo, Ing H. , "Pressure Measurement in Combustion Engines", Microsensor & Actuator Technology Center, Berlin Germany, http://www-mat.ee.tu-berlin.de/research/sic_sens/sic_sen3.htm, [accessed Aug. 30, 2013], 3 pages.
PCT/US2009/051372, "International Application Serial No. PCT/US2009/051372, International Preliminary Report on Patentability dated Apr. 12, 2011", Eaton Corporation, 6 pages.
PCT/US2009/051372, "International Application Serial No. PCT/US2009/051372, International Search Report and Written Opinion dated Sep. 9, 2009", Eaton Corporation, 7 pages.
PCT/US2011/028677, "International Application Serial No. PCT/US2011/028677, International Search Report and Written Opinion dated Oct. 7, 2011", Eaton Corporation, 9 pages.
PCT/US2011/029061, "International Application Serial No. PCT/US2011/029061, International Preliminary Report on Patentability dated Sep. 25, 2012", Eaton Corporation, 6 pages.
PCT/US2011/029061, "International Application Serial No. PCT/US2011/029061, International Search Report and Written Opinion dated Sep. 21, 2011", Eaton Corporation, 8 pages.
PCT/US2011/029065, "International Application Serial No. PCT/US2011/029065, International Preliminary Report on Patentability dated Sep. 25, 2012", Eaton Corporation, 6 pages.
PCT/US2011/029065, "International Application Serial No. PCT/US2011/029065, International Search Report and Written Opinion dated Sep. 21, 2011", Eaton Corporation, 8 pages.
PCT/US2013/029017, "International Application Serial No. PCT/US2013/029017, International Search Report and Written Opinion dated Jun. 4, 2013", Eaton Corporation, 7 pages.
PCT/US2013/037665, "International Application Serial No. PCT/US2013/037665, International Search Report and Written Opinion dated Aug. 7, 2013", Eaton Corporation, 12 pages.
PCT/US2013/037667, "International Application Serial No. PCT/US2013/037667, International Search Report and Written Opinion dated Sep. 25, 2013", Eaton Corporation, 16 pages.
PCT/US2013/038896, "International Application Serial No. PCT/US2013/038896, International Search Report and Written Opinion dated Aug. 12, 2013", Eaton Corporation, 16 pages.
PCT/US2013/068503, "International Application Serial No. PCT/US2013/068503, International Preliminary Report on Patentability With Written Opinion dated May 14, 2015", Eaton Corporation, 21 Pages.
PCT/US2013/068503, "International Application Serial No. PCT/US2013/068503, International Search Report and Written Opinion dated Feb. 13, 2014", Eaton Corporation, 24 Pages.
PCT/US2014/019870, "International Application Serial No. PCT/US2014/019870, International Preliminary Report on Patentability and Written Opinion dated Sep. 11, 2015", Eaton Corporation, 8 Pages.
PCT/US2014/019870, "International Application Serial No. PCT/US2014/019870, International Search Report and Written Opinion dated Jun. 3, 2014", Eaton Corporation, 11 Pages.
PCT/US2014/033395, "International Application Serial No. PCT/US2014/033395 International Preliminary Report on Patentability dated Oct. 22, 2015", Eaton Corporation, 15 Pages.
PCT/US2014/033395, "International Application Serial No. PCT/US2014/033395, International Search Report and Written Opinion dated Aug. 11, 2014", Eaton Corporation, 19 pages.
PCT/US2015/018445, "International Application Serial No. PCT/US2015/018445, International Search Report and Written Opinion dated Jun. 19, 2015", Eaton Corporation, 12 pages.
Rashidi, Manoochehr , "In-Cylinder Pressure and Flame Measurement", Engine Research Center, Shiraz University, Iran, prepared for the 3rd Conference on IC Engines, Tehran, 2004, 21 slides.
Shahroudi, Kamran , "Robust Design Evolution and Impact of In-Cylinder Pressure Sensors to Combustion Control and Optimization: A Systems and Strategy Perspective", Massachusetts Institute of Technology, http://dspace.mit.edu/bitstream/handle/1721.1/44700/297407259.pdf?...1, Jun. 2008, 123 pages.
Sussex University, "In-Cylinder Pressure and Analysis", Sussex University, East Sussex, United Kingdom, http://www.sussex.ac.uk/Users/tafb8/eti/eti_17_InCylinderMeasurement.pdf, [accessed Aug. 30, 2013], pp. 1-121.

* cited by examiner

VALVE ACTUATING DEVICE AND METHOD OF MAKING SAME

CROSS-REFERENCE TO RELATED APPLICATIONS

This application is a continuation of U.S. patent application Ser. No. 14/838,749 (EATN-0215-U01), filed Aug. 28, 2015, and entitled VALVE ACTUATING DEVICE AND METHOD OF MAKING SAME." U.S. patent application Ser. No. 14/838,749 (EATN-0215-U01) is a continuation of International Appl. No. PCT/US2015/018445 (EATN-0215-WO) filed Mar. 3, 2015, of the same title.

International Application No. PCT/US2015/018445 (EATN-0215-WO) claims the benefit of International Application No. PCT/US2014/019870 (EATN-0213-WO) filed on Mar. 3, 2014; U.S. patent application Ser. No. 61/986,976 (EATN-0215-P01) filed on May 1, 2014; and U.S. patent application Ser. No. 62/081,306 (EATN-0215-P02) filed on Nov. 18, 2014. Each of the above applications is incorporated herein by reference in its entirety.

FIELD

The present disclosure relates generally to switching roller finger followers or rocker arms in internal combustion engines and more particularly to a method of making or assembling an inner arm, an outer arm and a latch of the switching rocker arm.

BACKGROUND

A switching roller finger follower or rocker arm allows for control of valve actuation by alternating between two or more states. In some examples, the rocker arm can include multiple arms, such as an inner arm and an outer arm. In some circumstances, these arms can engage different cam lobes, such as low-lift lobes, high-lift lobes, and no-lift lobes. Mechanisms are required for switching rocker arm modes in a manner suited for operation of internal combustion engines.

Typically the components of the rocker arm are sized and sorted before assembly such that the appropriate combination of components is selected in an effort to satisfy latch lash tolerances. The sizing and sorting process can be time consuming. It would be desirable to simplify the assembly process and provide better latch lash control.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method of assembling a switching rocker arm assembly having an inner arm, an outer arm and a latch is provided. The method includes, indenting an outer arm surface on the outer arm, the outer arm surface defining an arcuate aperture. An inner arm surface can be indented on the inner arm at an inner arm latch shelf. A latch can be positioned relative to the inner and outer arms.

According to additional features, the inner and outer arms can be located into a fixture base. A press ram can be actuated onto a first indenting tool that acts against the outer arm surface. The outer arm can be collectively defined by a first outer arm and a second outer arm. Indenting the outer arm surface on the outer arm can further include, locating the first indenting tool through the arcuate passage. The arcuate aperture can be collectively defined by a first outer arm surface provided by the first outer arm and a second outer arm surface provided by the second outer arm. The first and second outer arm surfaces can be deflected with the first indenting tool. A pivot swivel can be positioned against a pivot axle that pivotally couples the inner arm and the outer arm. Misalignments of outer arm reaction surfaces can be compensated for with the fixture base. The indenting of the outer arm surface can be continued until a pin is permitted to slidably advance adjacent to the latch shelf. Actuating the press ram onto the first indenting tool can include transferring a force from the press ram onto a tungsten tool.

According to additional features, indenting the inner arm surface can further include positioning a second indenting tool through an outer arm latch bore and adjacent to the inner arm latch shelf. An indention load can be transferred onto the inner arm, through the second indenting tool and onto the inner arm latch shelf. Positioning the second indenting tool can comprise, positioning a tungsten pin through the outer arm latch bore and adjacent to the inner arm latch shelf. The indenting of the inner arm surface can be continued until a transformer provides a stop signal.

A method of assembling a switching rocker arm assembly according to additional features of the present disclosure is provided. The switching rocker arm assembly can have an inner arm, an outer arm and a latch. The switching rocker arm assembly can be configured to operate in a first normal-lift position where the inner and outer arms are locked together and a second no-lift position where the inner and outer arms move independently. The method can include, indenting an outer arm surface on the outer arm. The outer arm surface can define an arcuate aperture. An inner arm latch surface can be indented on the inner arm. The inner arm latch surface can correspond to a surface that the latch engages during the normal-lift position. A latch can be positioned relative to the inner and outer arms.

According to additional features, the outer arm can be collectively defined by a first outer arm and a second outer arm. Indenting the outer arm surface on the outer arm can further include, locating a first indenting tool through the arcuate aperture. The arcuate aperture can be defined by a first outer arm surface provided on the first outer arm and a second outer arm surface provided by the second outer arm. The first and second outer arm surfaces can be deflected with the first indenting tool. According to additional features, a pivot swivel can be positioned against a pivot axle that pivotally couples the inner arm and the outer arm. Misalignments of outer arm reaction forces can be compensated for with the fixture base. The indenting of the outer arm surface can be continued until a pin is permitted to slidably advance adjacent to the inner arm latch surface. A press ram can be actuated onto the first indenting tool. A force from the press ram can be transferred onto the indenting tool. Indenting the inner arm surface can further comprise, positioning a second indenting tool through an outer arm latch bore and adjacent to the inner arm latch surface. An indention load can be transferred onto the inner arm, through the second indenting tool and onto the inner arm latch surface. Positioning the second indenting tool can comprise positioning a tungsten pin through the outer arm latch bore and adjacent to the inner arm latch surface. The indenting of the inner arm latch surface can continue until a transformer provides a stop signal.

A method of assembling a switching rocker arm assembly according to other features is provided. The switching rocker arm assembly can have an inner arm, an outer arm and a latch. The outer arm can have an arcuate aperture collectively defined by a first outer arm surface on a first outer arm and a second outer arm surface on a second outer arm. The inner arm can have an inner arm latch surface. The switching rocker arm assembly can be configured to operate in a first normal-lift position where the inner and outer arms are locked together and a second no-lift position where the inner and outer arms move independently. The method can include, locating a first indenting tool through the arcuate passage. The first and second outer arm surfaces can be indented on the outer arm with the first indenting tool. A second indenting tool can be located adjacent to the inner arm latch surface. The inner arm latch surface on the inner arm can be indented. The inner arm latch surface can correspond to a surface that the latch engages during the normal-lift position. A latch can be positioned relative to the inner and outer arms.

According to additional features, the inner and outer arms can be located into a fixture base. A press ram can be actuated onto the first indenting tool that acts against the outer arm surface. A pivot swivel can be positioned against a pivot axle that pivotally couples the inner arm and the outer arm. Misalignments of outer arm reaction surfaces can be compensated for with the fixture base. The indenting of the outer arm surface can be continued until a pin is permitted to slidably advance adjacent to the inner arm latch surface. The indenting of the inner arm latch surface can further include, positioning the second indenting tool through an outer arm latch bore and adjacent to the inner arm latch surface. An indention load can be transferred onto the inner arm, through the second indenting tool and onto the inner arm latch surface.

BRIEF DESCRIPTION OF THE DRAWINGS

The present disclosure will become more fully understood from the detailed description and the accompanying drawings, wherein.

DETAILED DESCRIPTION

Figure 1:
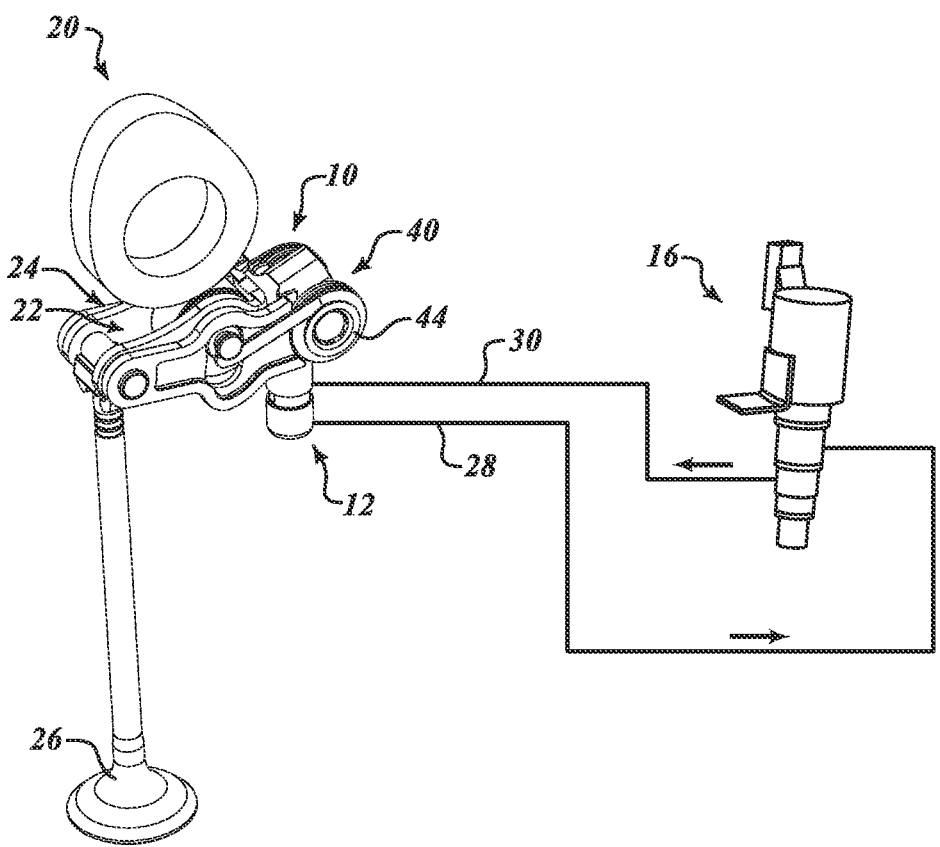
FIG. 1 is a front perspective view of an exemplary switching rocker arm constructed in accordance to one example of the present disclosure.

With initial reference to FIG. 1, an exemplary switching rocker arm constructed in accordance to one example of the present disclosure is shown and generally identified at reference 10. The switching rocker arm assembly 10 can be a compact cam-driven single-lobe cylinder deactivation (CDA-1L) switching rocker arm installed on a piston-driven internal combustion engine, and actuated with the combination of duel-feed hydraulic lash adjusters (DFHLA) 12 and oil control valves (OCV) 16. The switching rocker arm assembly 10 can be engaged by a single lobe cam 20. The switching rocker arm assembly 10 can include an inner arm 22, and an outer arm 24. The default configuration is in the normal-lift (latched) position where the inner arm 22 and the outer arm 24 are locked together, causing an engine valve 26 to open and allowing the cylinder to operate as it would in a standard valvetrain. The DFHLA 12 has two oil ports. A lower oil port 28 provides lash compensation and is fed engine oil similar to a standard HLA. An upper oil port 30, referred to as the switching pressure port, provides the conduit between controlled oil pressure from the OCV 16 and a latch 32. When the latch 32 is engaged, the inner arm 22 and the outer arm 24 operate together like a standard rocker arm to open the engine valve 26. In the no-lift (unlatched) position, the inner arm 22 and the outer arm 24 can move independently to enable cylinder deactivation.

A pair of lost motion torsion springs 40 is incorporated to bias the position of the inner arm 22 so that it always maintains continuous contact with the camshaft lobe 20. The torsion springs 40 are secured to mounts located on the outer arm 24 by spring retainers 44. The lost motion torsion springs 40 require a higher preload than designs that use multiple lobes to facilitate continuous contact between the camshaft lobe 20 and an inner arm roller bearing 50.

Figure 2:
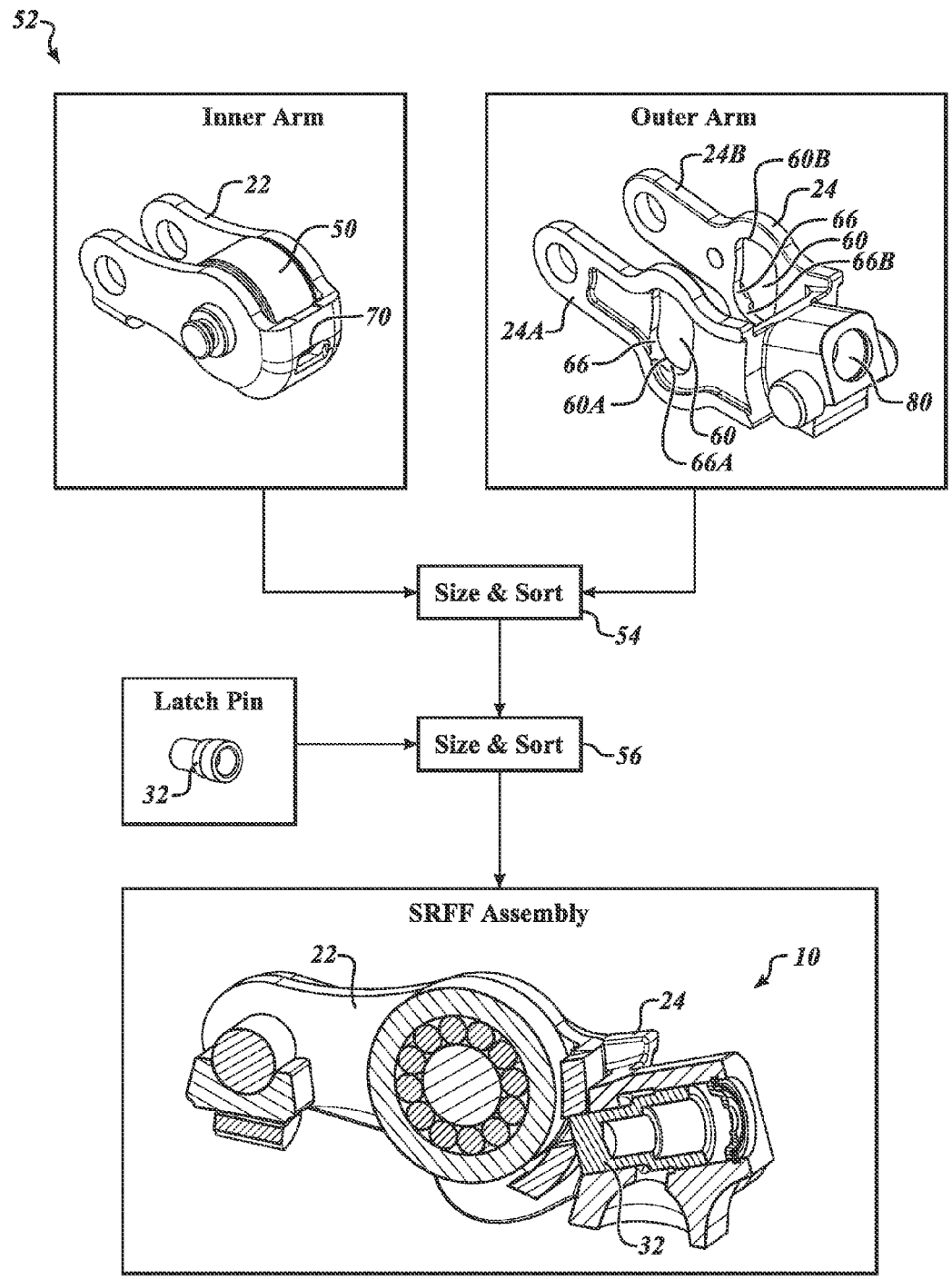
FIG. 2 is an exploded perspective view of an exemplary outer arm, inner arm and latch pin during a size and sort process according to one prior art example.

With reference now to FIG. 2, an exemplary flow chart 52 according to prior art is shown for determining the desired components to assemble together as a switching rocker arm assembly 10. In general, each inner arm 22 and outer arm 24 is measured to determine specific tolerances. Once they are measured, they are sorted such as in bins, identified at block 54. Similarly, each latch pin 32 is measured for tolerances and sorted accordingly. With the tolerances of each piece known, an inner arm 22, outer arm 24 and latch pin 32 may be selected that collectively satisfy a predetermined tolerance.

Figure 3:
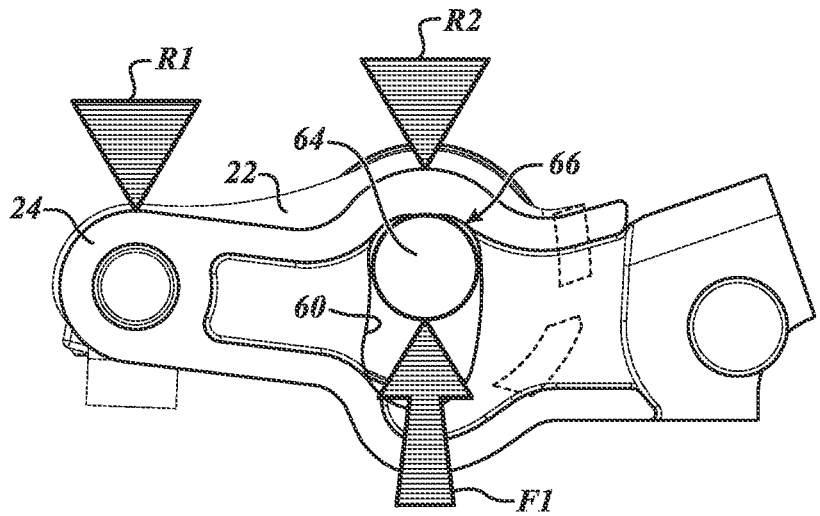
FIG. 3 is a side view of an exemplary kidney bean indention step according to the present disclosure.
Figure 4:
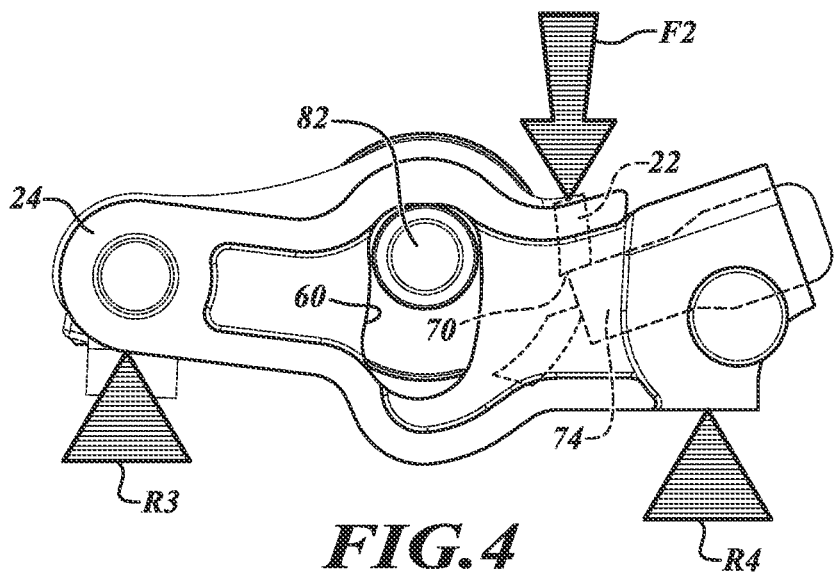
FIG. 4 is a side view of an exemplary latch indention step according to the present disclosure.

Turning now to FIGS. 3 and 4, the present teachings provide a two-step indention process for assembling the inner arm 22, the outer arm 24 and latch pin 32. In this regard, latch lash is set through the two step indention process. Step 1 (FIG. 3) includes kidney bean indention. In general, the outer arm 24 defines an arcuate aperture or passage 60 in the shape of a kidney bean. The arcuate passage 60 is collectively defined by a first arcuate aperture or passage 60A on a first outer arm 24A and a second arcuate aperture or passage 60B on a second outer arm 24B (see FIG. 2). The arcuate passage 60 similarly is provided with a kidney bean surface 66 collectively defined by a first kidney bean surface 66A on the first outer arm 24A and a second kidney bean surface 66B on the second outer arm 24B. In step 1, a force F1 is applied such as on an indenting tool, axle or rod such as a tungsten tool 64 causing indention of the surface 66 defining the arcuate passage 60. Reaction forces R1 and R2 can be provided at areas on the outer arm 24 as will become appreciated herein. The force F1 is applied until the surface 66 reaches an optimum air gap.

Step 2 (FIG. 4) includes latch indention. A force F2 is applied to the inner arm 22 to indent a latch surface 70 against a tungsten tool 74 assembled through a latch bore 80 (see FIS. 2 and 6) defined though the outer arm 24. The latch surface 70 is the surface, also referred to herein as an "inner arm latch shelf", that the latch pin 32 engages when the switching rocker arm assembly 10 is in the normal-lift (latched) position. A stop coining mandrel 82 can be located into the arcuate passage 60. Reaction forces R3 and R4 can be provided at areas on the outer arm 24 as will become appreciated herein. The force F2 is applied to the inner arm 22 until a final functional latch air gap is attained. Because the tolerances are controlled, a latch pin 32 (FIG. 2) may then be assembled into the outer arm 24 without the need to sort.

Figure 5:
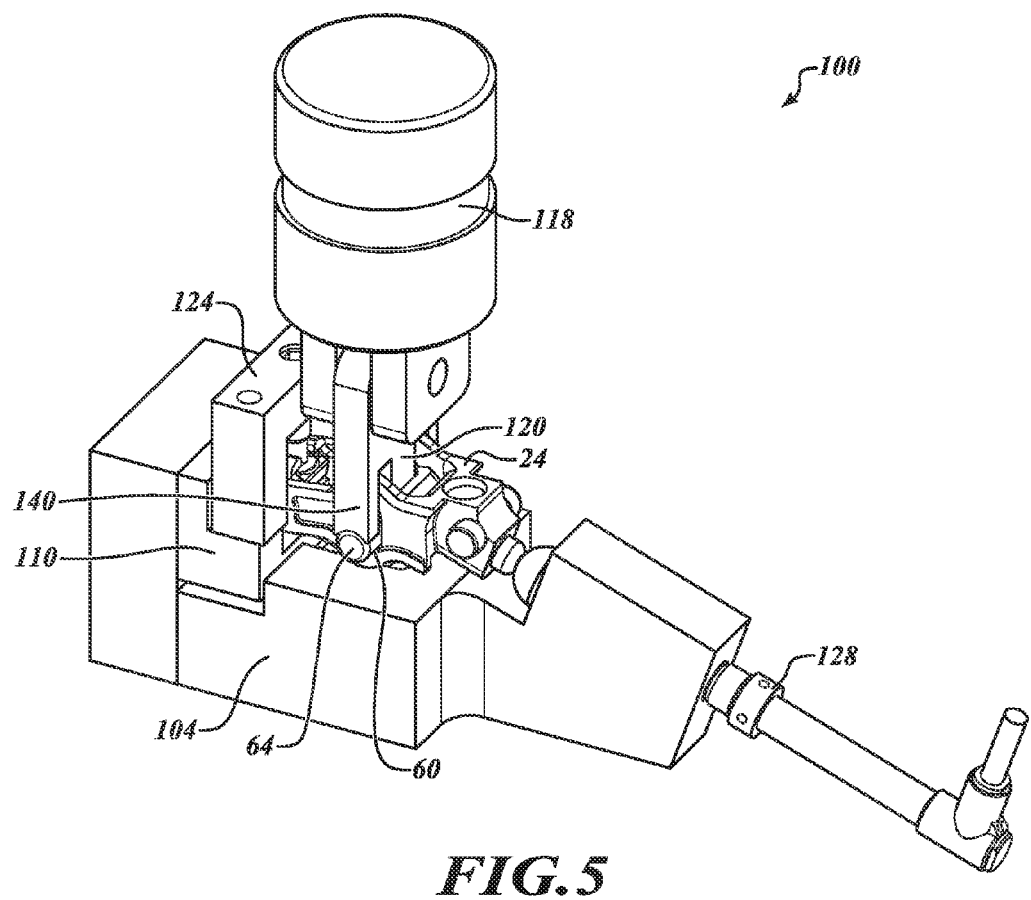
FIG. 5 a perspective view of an exemplary kidney bean indention fixture assembly constructed in accordance to one example of the present disclosure.
Figure 6:
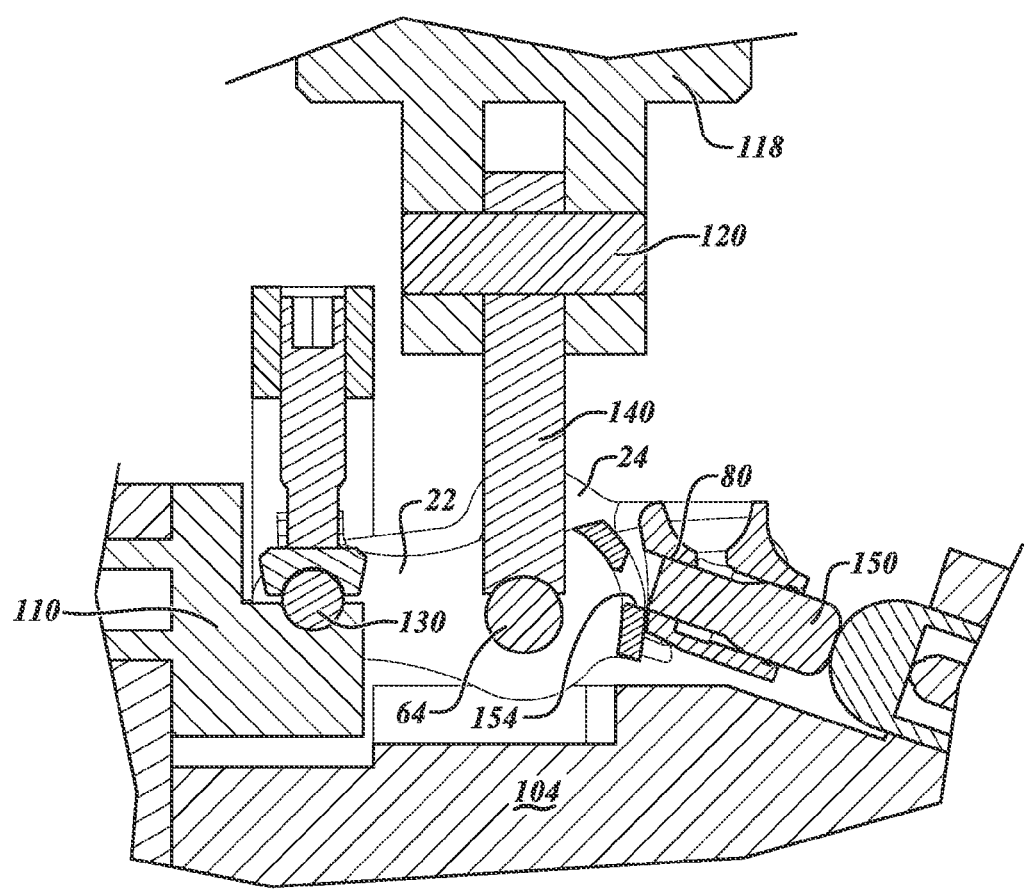
FIG. 6 is a cross-sectional view of the kidney bean indention fixture assembly of FIG.
Figure 7:
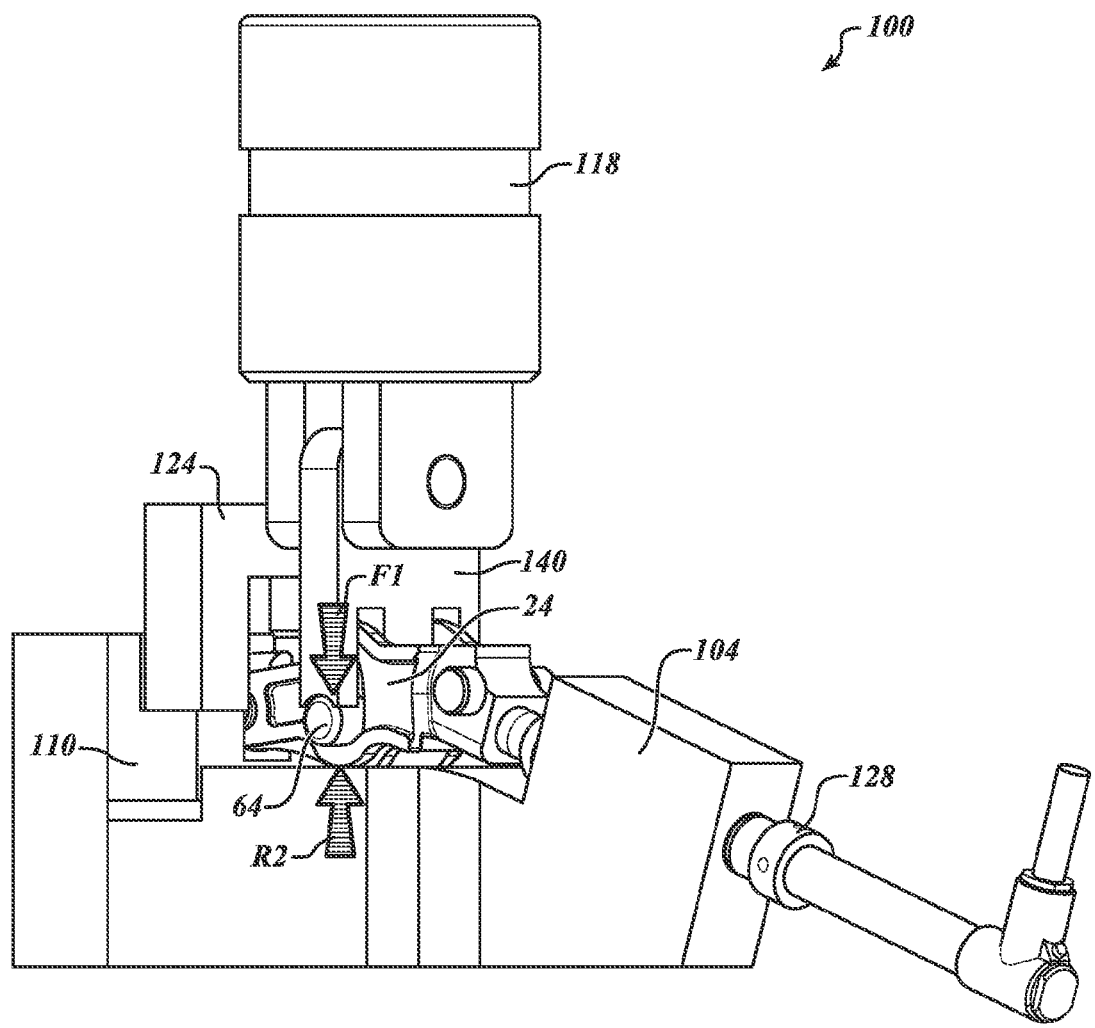
FIG. 7 is a perspective detail view of a tungsten axle indenting a surface that defines the kidney bean aperture.

With reference now to FIGS. 5-7, exemplary components that may be used to carry out the kidney bean indention process of step 1 (FIG. 3) will be described. In general, a kidney bean indention fixture assembly 100 can include a fixture base 104, a pivot swivel 110, a press ram 118, a press swivel 120, the tungsten tool or axle 64, an E-foot clamp 124 and a linear variable displacement transformer (LVDT) sensor 128. During use, the outer arm 24 may be positioned onto the fixture base 104. Arms 140 extending from the press swivel 120 can engage the tungsten axle 64. The pivot swivel 110 and E-foot clamp 124 can be positioned to support an end of the outer arm 24 and an end of the inner arm 22. The press ram 118 can transfer a force through the press swivel 120 onto the tungsten axle 64 positioned in the kidney bean aperture 60 that ultimately causes an indentation onto the surface 66 of the kidney bean aperture 60 (see also FIG. 3). Of note, the inner and outer arms 22 and 24 are both flipped to an inverted position in the kidney bean indention fixture assembly 100 as compared to the representation shown in FIG. 3. It will be appreciated that the inner and outer arms 22 and 24 may be positioned in any orientation during indentation of the surface 66 within the scope of the present teachings. The LVDT sensor 128 can measure variables such as load, vibration and displacement during the indention process.

With continued reference to FIGS. 5-7, further features of the kidney bean indention fixture assembly 100 and indention process will be described. The indention load F1 (FIG. 3) is applied onto the tungsten axle 64 with the arms 140. A reaction force (such as R1 and R2, FIG. 3) on the outer arm 24 is provided by the fixture base 104. The pivot axle 130 (FIG. 6) is held by the pivot swivel 110 to compensate for outer arm reaction surfaces relative misalignments (in contact with the fixture base 104). The tungsten axle 64 is loaded through the press swivel 120 to compensate kidney bean surfaces 66A, 66B relative misalignment. When the indention reaches a value to allow a pin 150 to move into a latch shelf 154 provided at the latch surface 70, the LVDT sensor 128 provides a stop signal to the press ram 118.

The kidney bean indention fixture assembly 100 provides freedom of parallelism between the pivot axle 130 to the inner arm bearing axle bore. Parallelism compensation is provided during initial setup. The components are locked from relative movement during the indention process. The kidney bean indention fixture assembly 100 further provides outer arm 24 casting variation compensation. Uniform tool displacement is provided on opposite sides after compensation. The press ram 118 is fixed. A flat ram can be acting on the carbide tool to allow inner arm length tolerance variation. A measuring device can be provided for measuring an initial latch air gap. A displacement transducer can be provided that monitors the coining mandrel.

Figure 8:
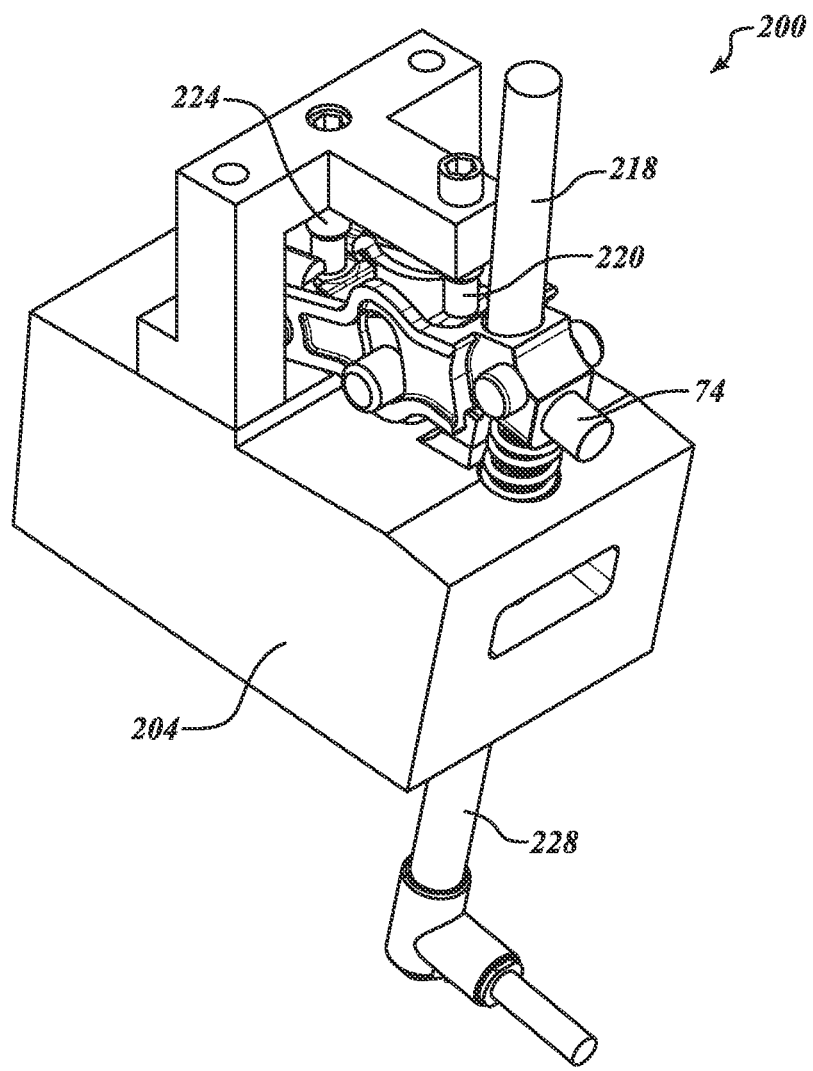
FIG. 8 is a perspective view of a latch indention fixture assembly constructed in accordance to one example of the present disclosure.
Figure 9:
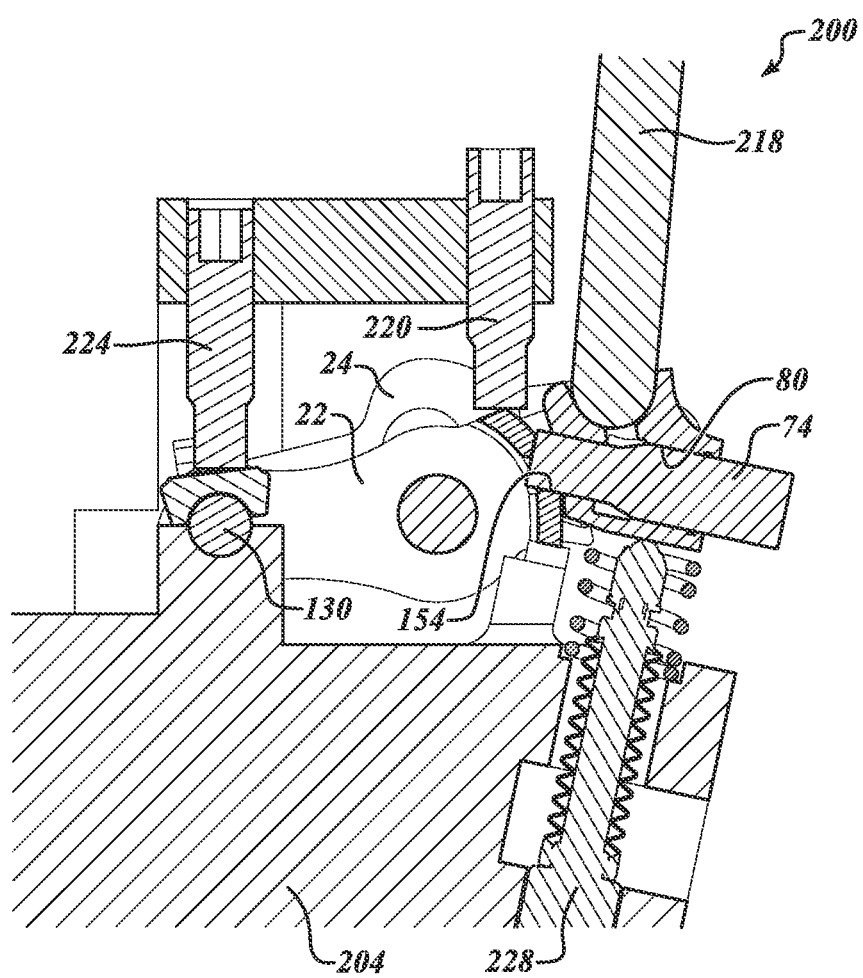
FIG. 9 is a cross-sectional view of the latch indention fixture assembly of FIG. 8.
Figure 10:
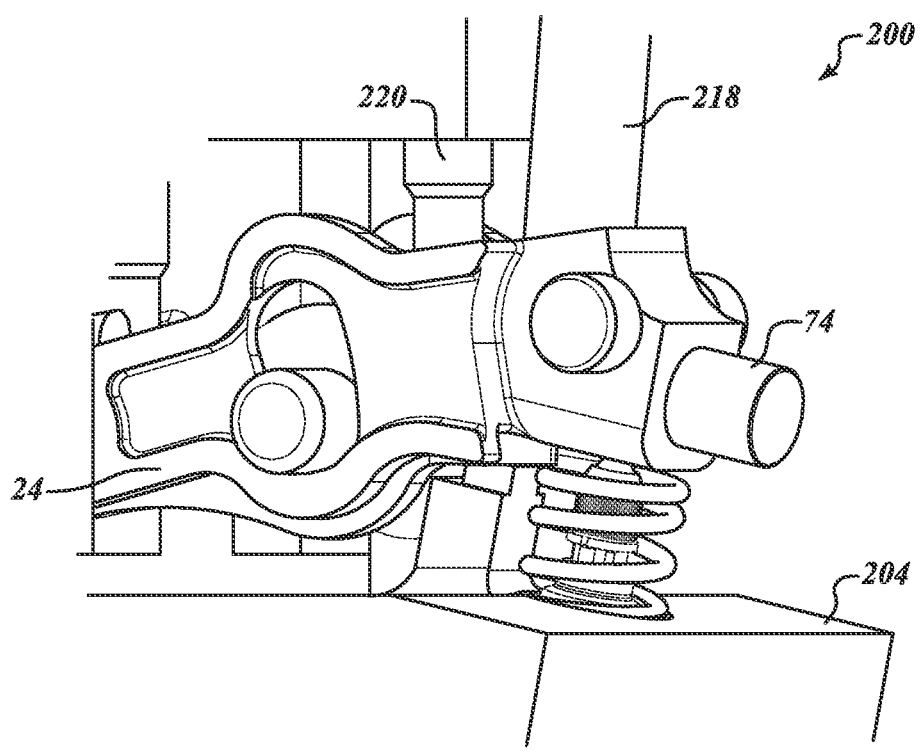
FIG. 10 is perspective detail view of the inner arm contacting the fixture base of the latch indention fixture assembly of FIG. 8.

With reference now to FIGS. 8-10, exemplary components that may be used to carry out the latch indention process of step 2 (FIG. 4) will be described. In general, a latch indention fixture assembly 200 can include a fixture base 204, a press ram 218, the tungsten pin 74, an inner arm clamp 220, an E-foot pivot axle clamp 224 and a LVDT sensor 228. The pivot axle 130 is held by the pivot axle clamp 224 (Efoot). The inner arm 22 is clamped to be in contact with the fixture base 204. The tungsten pin 74 is inserted into the outer arm latch bore 80 and inner arm latch shelf 154 (available subsequent to step 1, see FIG. 6). An indention load is applied on the outer arm socket through the press ram 218. A reaction force on the inner arm 22 is provided by the fixture base 204. The shelf 154 is indented as a result of the force transferred from the tungsten pin 74. When the indention of the shelf 154 reaches the targeted value, the LVDT 228 provides a stop signal to the press ram 218.

The latch indention fixture assembly 200 generally provides a tombstone loading structure that prevents tooling deflection side to side. A riser block is provided on the fixture base 204. A displacement transducer monitors the coining mandrel.

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A tool for indenting an inner arm of a rocker arm assembly, the rocker arm assembly including an inner arm, an outer arm, and a pivot axle that pivotally couples the inner arm and the outer arm, wherein the outer arm includes a latch bore for inserting a latch pin for selectively engaging a latch shelf of the inner arm to lock the inner arm and the outer arm together, the tool comprising:
   a press ram comprising a pressing tool;
   a fixture base for holding a first surface of the inner arm of the rocker arm assembly and for holding the outer arm of the rocker arm assembly;
   a pivot axle clamp atop the fixture base for holding the pivot axle of the rocker arm assembly;
   an inner arm clamp for restraining an opposite surface of the inner arm of the rocker arm assembly; and
   an indentation pin positioned through the latch bore of the outer arm for bearing against the latch shelf of the inner arm;
   wherein said press ram is configured to actuate the pressing tool to apply an indentation load on the outer arm such that a reaction force transferred from the indentation pin indents the latch shelf of the inner arm.

2. The tool of claim 1, wherein the pivot axle clamp comprises an E-shape clamp.

3. The tool of claim 1, further comprising a sensor adapted to mount against an outer surface of the latch bore, the outer surface of the latch bore opposite the outer arm socket of the outer arm.

4. The tool of claim 3, wherein the sensor comprises a linear variable displacement transformer (LVDT).

5. The tool of claim 3, wherein the sensor is adapted to send a stop signal to the press ram when the indentation pin travels a desired distance.

6. The tool of claim 5, wherein the pivot axle and the fixture base are adapted to oppose a force imparted by the press ram.

7. The tool of claim 5, wherein the desired distance is adapted so that the latch pin is capable of being slidably advanced within the latch bore of the outer arm to engage the latch shelf of the inner arm.

8. The tool of claim 1, wherein the indentation pin comprises tungsten.

* * * * *

UNITED STATES PATENT AND TRADEMARK OFFICE
CERTIFICATE OF CORRECTION

PATENT NO. : 9,995,183 B2
APPLICATION NO. : 15/171457
DATED : June 12, 2018
INVENTOR(S) : James R. Sheren et al.

It is certified that error appears in the above-identified patent and that said Letters Patent is hereby corrected as shown below:

In the Specification

In Column 3, Line 57, delete "FIG." and insert -- FIG. 5; --, therefor.

In Column 5, Line 4, delete "FIS." and insert -- FIGS. --, therefor.

Signed and Sealed this
Fourth Day of December, 2018

Andrei Iancu
*Director of the United States Patent and Trademark Office*